United States Patent
Cerwall et al.

(10) Patent No.: US 6,546,255 B1
(45) Date of Patent: Apr. 8, 2003

(54) CELLULAR MOBILE COMMUNICATION SYSTEM AND A METHOD FOR SUCH A SYSTEM

(75) Inventors: Carl Patrik Cerwall, Guildford (GB); Lars Erik Westerberg, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/503,503

(22) Filed: Feb. 14, 2000

(30) Foreign Application Priority Data

Dec. 15, 1998 (SE) .............................................. 9804432

(51) Int. Cl.⁷ .......................... H04Q 7/08; H04Q 7/12; H04Q 7/14; H04Q 7/20
(52) U.S. Cl. ................. 455/449; 455/422; 455/432; 455/458; 455/456; 455/515; 340/7.21; 340/7.22; 340/7.23
(58) Field of Search ................. 455/449, 422, 455/432, 433, 435, 436, 437, 438, 439, 440, 441, 442, 443, 444, 445, 446, 447, 448, 456, 457, 458, 517, 512, 515, 550, 560; 340/7.21, 7.22, 7.23

(56) References Cited

U.S. PATENT DOCUMENTS

| | | | |
|---|---|---|---|
| 5,548,816 A | 8/1996 | Devaney | 455/456 |
| 5,590,398 A | 12/1996 | Matthews | 455/433 |
| 5,594,776 A | 1/1997 | Dent | 455/458 |
| 5,613,199 A | 3/1997 | Yahagi | 455/435 |
| 5,633,913 A | 5/1997 | Talarmo | 455/446 |
| 5,862,483 A | * 1/1999 | Fletcher et al. | 455/435 |
| 5,924,042 A | * 7/1999 | Sakamoto et al. | 455/458 |
| 5,953,667 A | * 9/1999 | Kauppi | 455/440 |

FOREIGN PATENT DOCUMENTS

| | | |
|---|---|---|
| WO | 93/23965 | 11/1993 |
| WO | 94/07337 | 3/1994 |
| WO | 94/13114 | 6/1994 |
| WO | 94/16529 | 7/1994 |
| WO | 96/01030 | 1/1996 |
| WO | 98/35520 | 8/1998 |

\* cited by examiner

*Primary Examiner*—Lee Nguyen
*Assistant Examiner*—Keith Ferguson

(57) ABSTRACT

The present invention relates to a method in a cellular mobile communication system for transmitting Pages, and such a system. The cells of the system are subdivided into two classes. To which class a cell is assigned is decided by its capacity to transmit Pages or by the amount of Page responses received within the cells. When paging a mobile station, the Page is first transmitted in the cells of the first class. If no response is received to that Page, the Page is transmitted also in the cells of the second class. An advantage is that there will be fewer Pages congested due to lack of capacity for transmission. Transmitted Pages in the cells of the second class are primarily transmitted to mobile stations that are really present within those cells. Thereby the probability increases that all mobile stations will be reached by Pages intended for them.

13 Claims, 4 Drawing Sheets

CELLULAR MOBILE COMMUNICATION SYSTEM AND A METHOD FOR SUCH A SYSTEM

TECHNICAL FIELD

The present invention refers to a cellular mobile communication system and a method in such a system for paging a mobile station.

STATE OF THE ART

An area covered by a cellular mobile communication system is subdivided into cells. In each cell, there is a radio base station, that serves mobile stations within the cell. Via a radio base station, communication can progress between the mobile station and a fixed network.

Further, the area of coverage is subdivided into a smaller number of location areas. Each location area comprises a plurality of cells.

The fixed part of the mobile communication system does not have any information on in which cell a mobile station in idle mode is positioned. On the other hand, it is registered in which location area the mobile station is.

When a network initiated link is to be set up to the mobile station, a Page is transmitted to the mobile station in all the cells within the registered location area. The mobile station receives the Page and responds in one of the cells. The continued communication is made in that cell. In a location area, there are generally a large number of mobile stations, and the number of Pages transmitted in the location area is in proportion to the number of mobile stations within the location area. A problem is that the capacity for transmitting Pages is not always corresponding to the need. For this reason, some Pages will be congested.

A solution to this problem is given in U.S. Pat. No. 5,590,398. The solution is that the mobile communication system, for each mobile station, collects statistics on in which cells the mobile station usually generates traffic and responds to Pages. By means of this statistics, a virtual location area is created for each mobile station. Pages to that mobile station are thereafter transmitted into the virtual location area. Since the virtual location area is smaller than the previously defined location area, the Page will be transmitted into a fewer number of cells, and thereby the total risk for Pages to be congested is diminished. A problem with the proposed solution is that it is hard to collect, update and arrange statistics for every participating mobile station in the mobile communication system. The solution is therefore difficult to implement. A further problem with the solution is that the statistics may lead to a trespass into personal integrity.

SUMMARY OF THE INVENTION

The present invention is directed to a problem in a mobile communication system, without means for collecting statistics for every mobile station, to diminish the risk of Pages being congested and therefore not being transmitted.

Another problem is that it may take a long time before the mobile station receives the Page. This problem is connected to the first one. Most often, the first problem may be reduced at the expense of the other, and vice versa.

A further problem is that a new method for transmitting Pages must not be difficult to introduce in existing mobile communication systems.

An object of the present invention is thus to limit the transmission of a Page to a smaller number of cells but retaining a large probability for the Paged mobile station to be reached by the Page.

The problem is solved according to the present invention by a cellular mobile communication system and a method in such a system, where the cells of the system are split up into two classes. Pages are primarily transmitted in the cells of the first class.

According to one aspect of the invention, a cell is assigned to the first class if it has a high capacity for transmitting Pages. According to another aspect of the invention, a cell is assigned to the first class if a large proportion of responses to Pages are received in the cell.

The invention is used, for example, in combination with grouping of cells into location areas. The mobile communication system registers in which location area each mobile station is present. When a Page is to be transmitted to a certain mobile station, it is first transmitted to cells of the first class within the location area which has been registered for the mobile station. If the mobile station does not respond within a predetermined time, the Page is then transmitted in more cells, e.g. all cells within the location area.

An advantage with the invention is that a fewer number of Pages need to be transmitted in order for the mobile station to be reached by one. In that way, less radio capacity is used for transmitting Pages. This radio capacity can instead be used for other radio traffic.

With the present invention, the probability is increased that a mobile station present in a cell with low capacity to transmit Pages will really be reached by a Page. In the cell, only a smaller proportion of the Pages are transmitted, i.e. such Pages which are intended for mobile stations which with a large probability are present in a cell with a low Page capacity. Since only a smaller proportion of the Pages will have to be transmitted in these cells, the risk of Pages being congested is diminished within them.

The invention has the advantage that essential gains in truncation can be made, since the limited number of channels dedicated for transmitting Pages is distributed so that a larger group of mobile stations listen to a larger common resource for transmitting of Pages. This reduces the risk of congestion. This solution and advantage is possible because the cell structure is nowadays to a large degree hierarchical. This means i.a. that cells have different maximal allowed highest signal strength. Mobile stations in idle mode primarily listen in cells with high signal strength. There is thus a larger chance that a mobile station will respond in a cell which is high in the hierarchical structure.

A further advantage is that it is simple to select those cells in which a Page is first to be transmitted. Existing mobile communication systems can therefore be simply modified in order to use the inventive method.

The invention will now be described in more detail by means of preferred embodiments and with reference to the attached drawing.

PREFERRED EMBODIMENTS

Figure 1A:
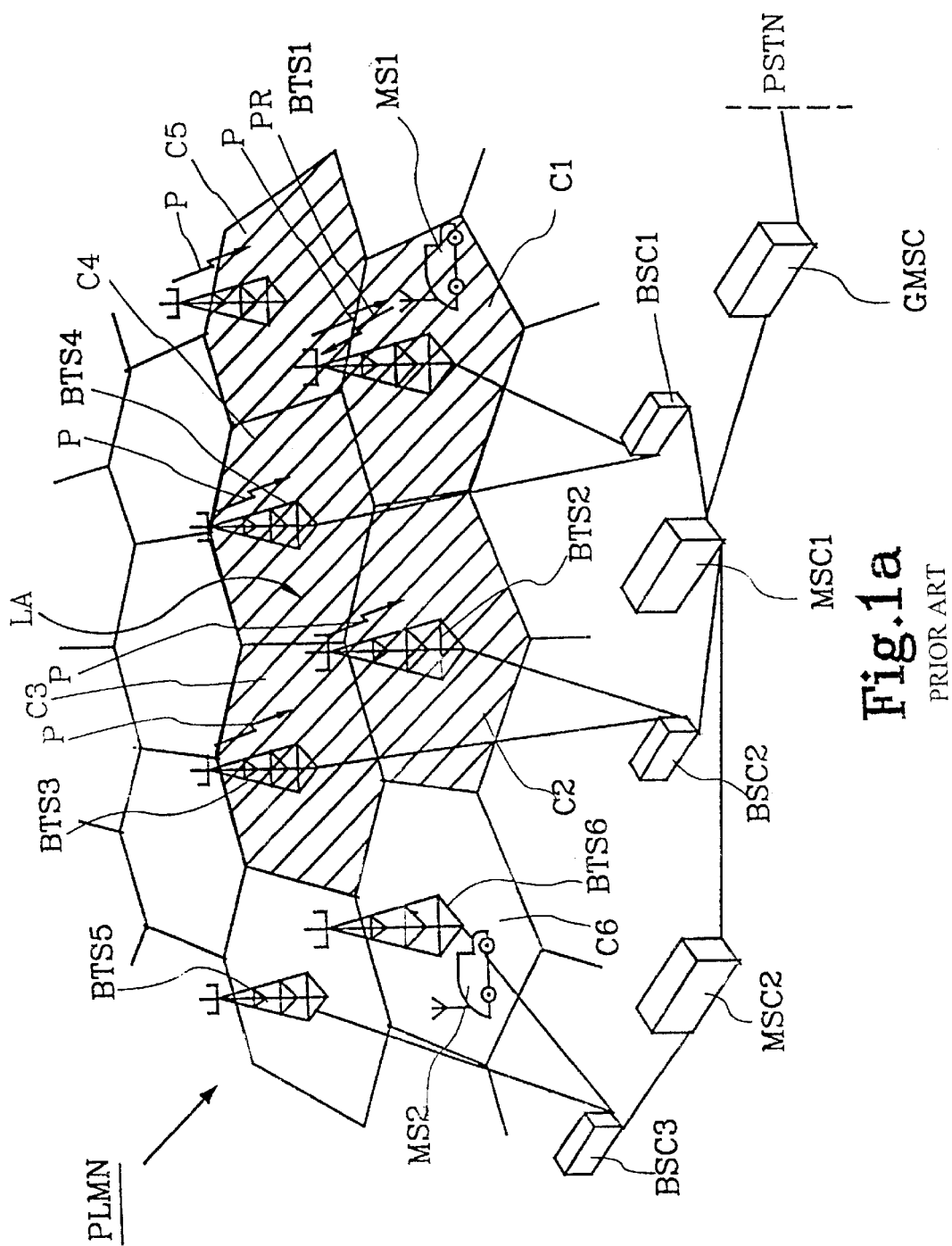
FIG. 1a shows a view of nodes and cells in a prior art mobile communication system.

FIG. 1a shows a view of a prior art GSM-network PLMN, which is used in order to clarify embodiments of the present invention. To begin with, there is described how the prior art GSM-system PLMN works. The GSM-network PLMN offers communication services to mobile stations MS1–MS2 within a geographic area of coverage. The geographic coverage area is subdivided into a number of cells C1–C6. Each cell C1–C6 is served by a corresponding radio base station BTS1–BTS6. A number of radio base stations BTS1–BTS6 are connected to a base station controler BSC1–BSC3. A number of base station controlers BSC1–BSC3 are connected to an exchange MSC1, MSC2. FIG. 1a shows two exchanges MSC1, MSC2, which are connected to each other and to a gateway GMSC. Via the gateway GMSC, the GSM-network PLMN is connected to other telecommunication networks PSTN, which, however, are not shown in FIG. 1.

Via the gateway GMSC, the GSM-network PLMN receives a demand for making a connection to a first mobile station MS1. The gateway GMSC is provided with a register, not shown in FIG. 1a. In this register there is information about which exchange MSC1, MSC2 is presently serving the first mobile station MS1. In this case, it is a first exchange MSC1 which serves the first mobile station MS1. The gateway GMSC demands the first exchange MSC1 to set up the demanded connection to the first mobile station MS1.

The first exchange MSC1 has information about in which location area LA the first mobile station is present. A location area consists of a number of cells defined as belonging to this area. In FIG. 1, the location area LA consists of all five cells C1–C5 which are connected to the first exchange MSC1. The five cells C1–C5 which form the location area LA are hatched. There is no information in which cell the first mobile station MS1 is present. In order to contact the first mobile station MS1, the first exchange MSC1 orders the connected base station controler BSC1–BSC2 to transmit Page P provided for the mobile station MS1 into the five cells C1–C5 which comprise the location area LA. The Page P is responded PA by the first mobile station MS in a first cell C1 within which it is present. The continued signalling with the first mobile station MS1 then takes place via the first radio base station BTS1 serving the first cell C1.

It may happen that the first mobile station MS1 has left the location area LA without this being registered by the GSM-network PLMN. If the first mobile station MS1 does not respond to the Page, a further Page is transmitted into the whole GSM-network PLMN.

The cell structure shown in FIG. 1 is a simplified image. In real systems, the cell borders are not distinct; certain areas will be covered by more than one cell at the same time, and there may be slits in the coverage. Moreover, cells C1–C6 have different size. When building a GSM-network PLMN, geographic coverage is important, and the cell structure resembles the one of FIG. 1. After some time, a larger traffic capacity will be needed and the network is then extended with a cell structure which is most often described as hierarchical. This expression means that within an existing cell having its base station antenna placed high up, new smaller cells are built. FIG. 2 shows a macro cell MacC which has its antenna placed high up and having a large coverage area. Within the macrocell MacC, two microcells MicC have been built. The microcells MicC have a smaller coverage area than the macro-cell MacC and take less telecommunication traffic.

Figure 3:
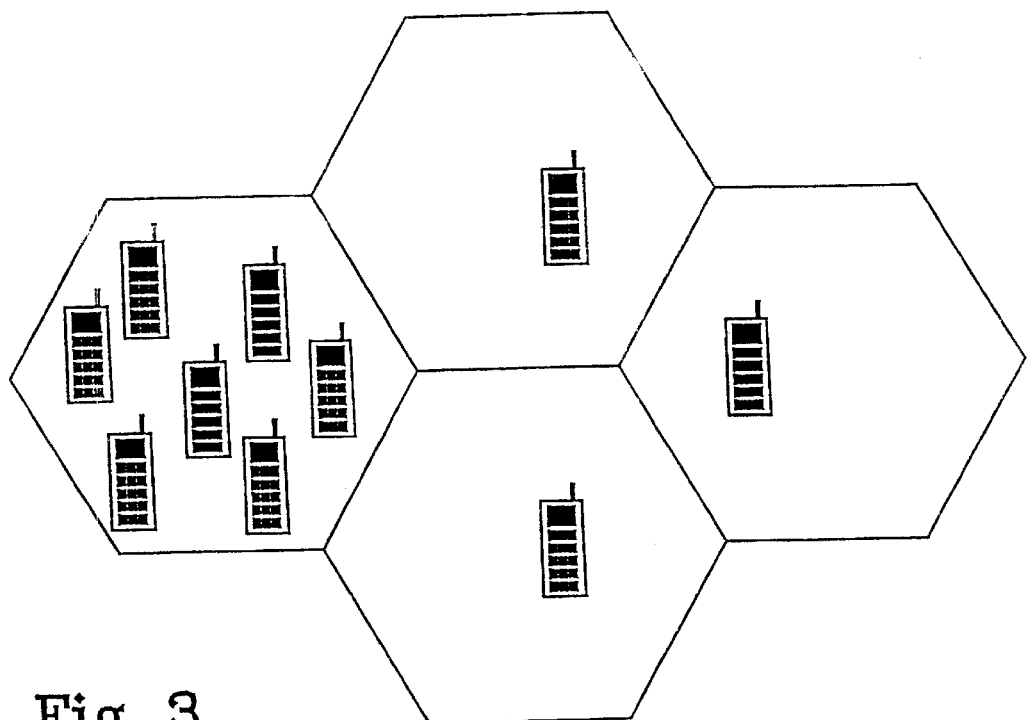
FIG. 3 shows the distribution of mobile stations in different/various cells.

FIG. 3 shows a simplified cell structure with a number of mobile stations which are unevenly distributed over the cells. This is to illustrate that different cells serve different numbers of mobile stations.

Every cell C1–C6, MacC–MicC has a certain set of radio channels at disposal. The number of radio channels varies between the cells C1–C6, MacC, MicC, and should be in proportion to the need in each cell C1–C6, MacC, MicC. The capacity to transmit Pages also varies between the cells C1–C6, MacC, MicC. The cells C1–C6, MacC, MicC can be provided with one or more Page channels (Paging Channel PCH), and moreover the capacity of the Page channel for transmitting Pages may vary. This uneven distribution of the capacity to transmit Pages does not reflect a need but is a compromise between the need to use the radio channels for Pages and the need for other traffic. When the radio channels are distributed in many cells C1–C6, MacC, MicC in a hierarchical cell structure, the proportion of Page channels increases but must still be kept limited to the benefit of the number of traffic channels. In particular, in cells having few channels, e.g. pico- and microcells, a great proportion of the channels are used for transmitting Pages.

In the cells C1–C6, MacC, MicC there is thus a certain capacity for transmitting Pages P and this capacity varies between the different cells C1–C6, MacC, MicC. According to the prior art method, Pages P are transmitted in all cells C1–C6, MacC, MicC within the location area LA. If the number of Pages during a time period exceeds the capacity for transmitting Pages P, some are not being transmitted due to congestion. This happens first in cells C1–C6, MacC, MicC having low capacity for transmitting Pages P. For each cell C1–C6, MacC, MicC there is a buffer where Pages may be stored for a certain time, waiting to be transmitted. A Page P is taken away from the buffer without being transmitted if it has been stored for a certain time. This means that in cells C1–C6, MacC, MicC with low capacity, some Pages will not be transmitted. If the first mobile station MS1 is present in such a cell C1–C6, MacC, MicC, it will not be reached by the intended Page P.

Figure 1B:
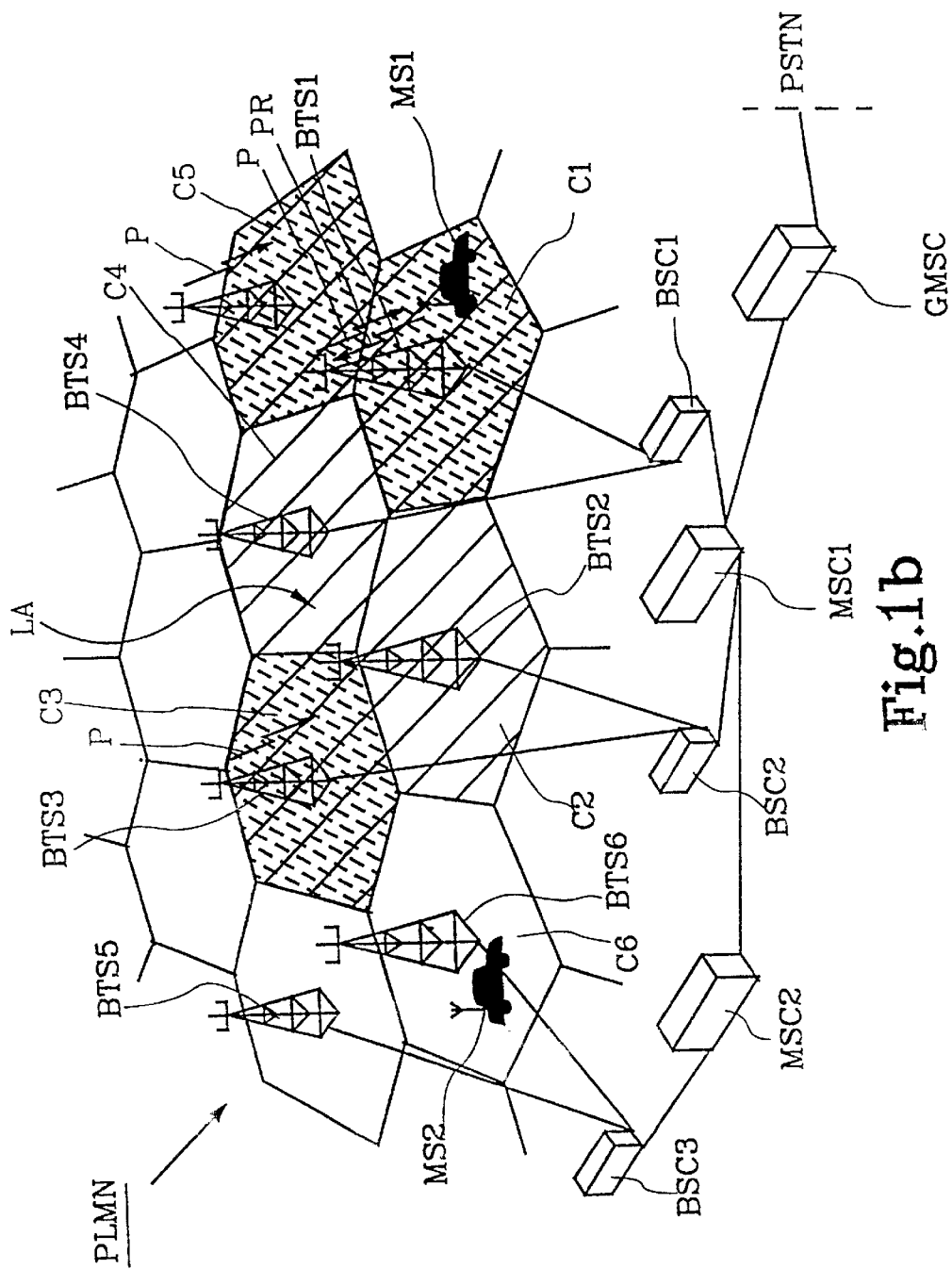
FIG. 1b shows the same mobile communication system as FIG. 1a, modified according to the invention.
Figure 2:
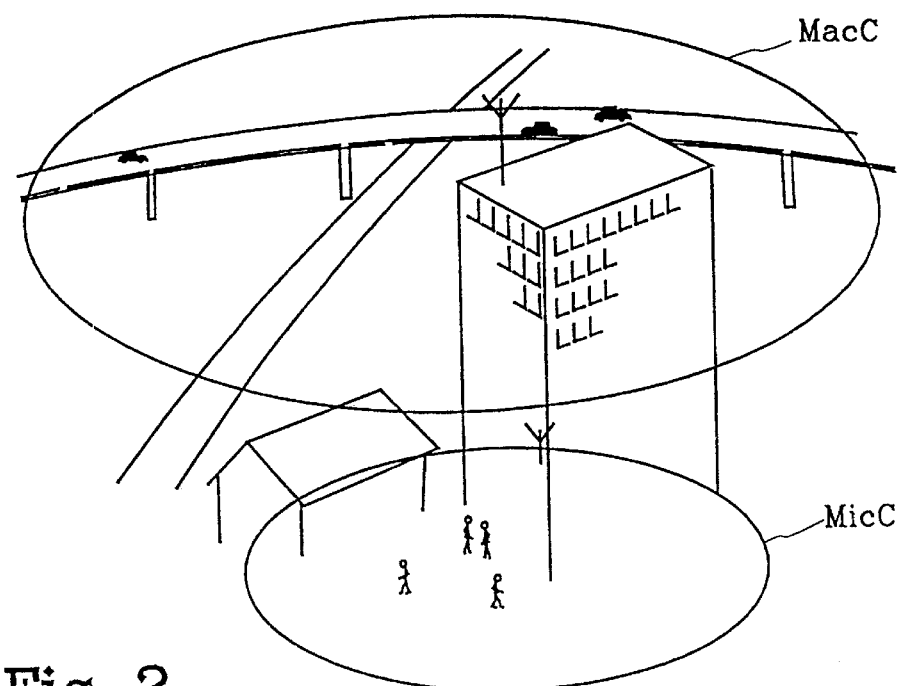
FIG. 2 shows a view of a hierarchical cell structure.

FIG. 1b shows the same mobile communication system as FIG. 1a. Out of the five cells C1–C6 making up the location area, however, three cells C1, C3, C5 are marked with dashed lines. This is because those three cells C1, C3, C5 have been assigned first class according to a method described below.

Figure 4:
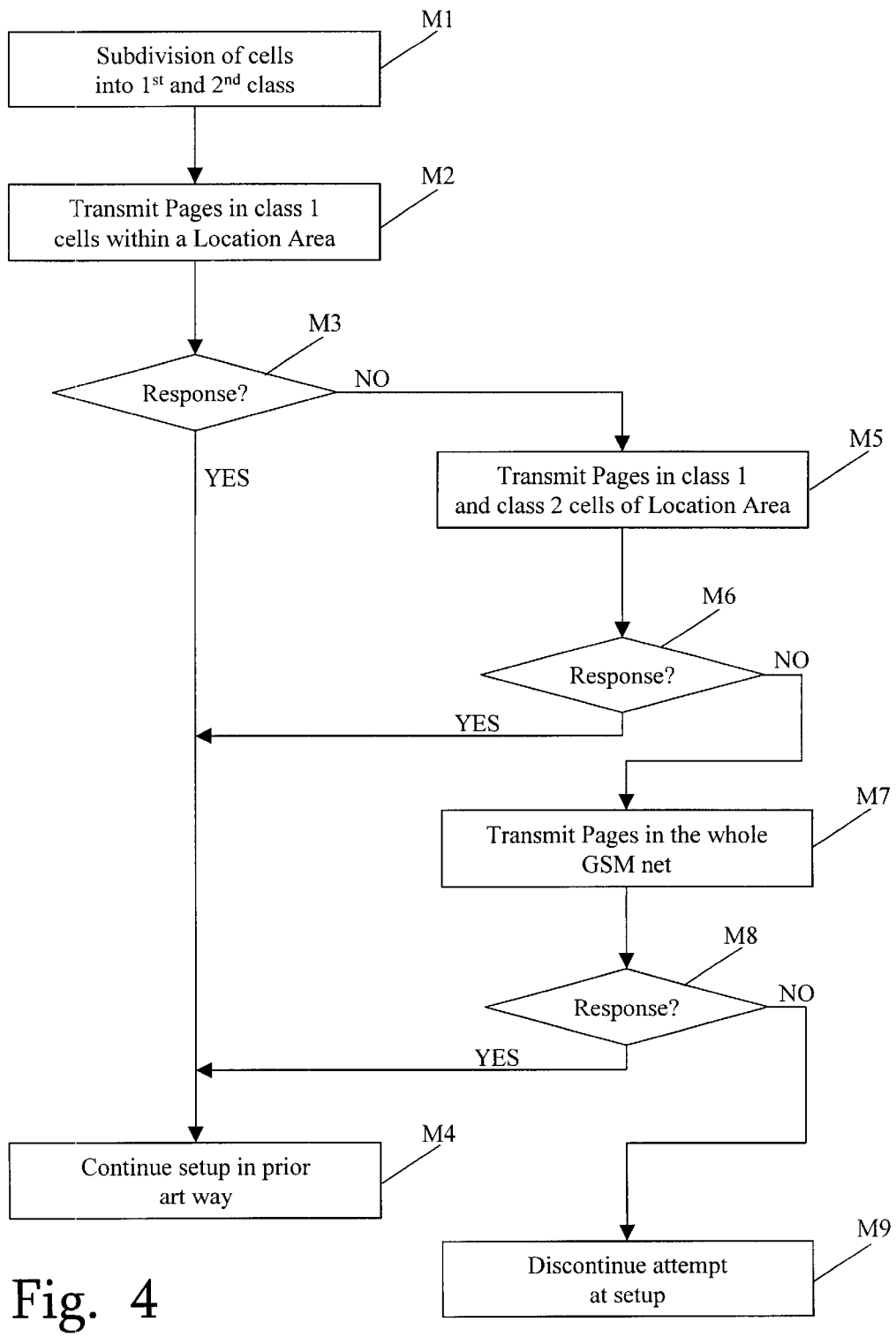
FIG. 4 shows a flow diagram of a method according to the invention.

According to one inventive method, the cells C1–C6, MacC, MicC are subdivided into a first and a second class, see FIG. 4 step M1. Among others, the three cells C1, C3, C5 in FIG. 1b are assigned to first class.

The Page P to the first mobile station MS1 is first transmitted to the three cells C1, C3, C5, which belong to the first class within the location area LA, according to a following step M2. If no response to this Page is received from the first mobile station MS1, i.e. "no" to the question in step M3, a further Page is transmitted within the whole location area LA, according to a step M5.

If no response to this Page is received, i.e. "no" to the question in step M6, yet another Page is transmitted within the whole GSM-network PLMN to the first mobile station MS1, according to a step M7.

If no response is received to this Page either, i.e. "no" to the question according to step M8, the attempt of setting up is stopped, according to a step M9.

If, on the contrary, the first mobile station MS1 responds to one of the Pages, i.e. "yes" to one of the questions in the steps M3, M6 or M8, the set up of a connection with the first mobile station MS1 continues in the way known in the prior art. This means that the continued signalling is performed in the cell C1–C6 from which the first mobile station MS1 responded.

According to one embodiment, the cells C1–C6 are subdivided into a first and a second class, according to the step M1, based on the capacity of each cell C1–C6 to transmit Pages P. Thus, cells having two Page channels are assigned to class 1 and cells with one Page channel are assigned to class 2.

According to an alternative embodiment, statistics is collected about the number of responses to Pages P having taken place in each cell C1–C6. Cells C1–C6 having high response frequency are assigned to class 1 while the rest of the cells are assigned to class 2.

The collected statistics shows, for example, how the responses are distributed over time day and night and how the classification varies over time in a corresponding way.

In the embodiments above, the cells were subdivided into two groups. It is naturally possible to split up the cells into more groups. If a response is not received after transmitting of a Page in the first group, a Page is transmitted in the second group and then in the third, etc. In most cases, however, the subdivision into two groups is appropriate because it must not take too long time before the mobile station has received the Page.

This alternative embodiment is particularly suitable for use in mobile communication systems PLMN which distribute the radio resources depending on the traffic needs. One advantage with mobile radio systems which distribute the spectrum based on the CDMA-principle is that the capacity of handling radio traffic is not fixedly distributed to the cells but varies according to needs. To distribute the transmitting of Pages according to the present method is therefore advantageous in a CDMA-system.

For other systems founded upon there being a frequency planning, methods exist where the system itself distributes channels adaptively. Such methods are sometimes called ACAA (Adaptive Channel Allocation) or DCAA (Dynamic Channel Allocation). The known methods are founded upon the radio channels to which a cell has access being selected by the mobile communication system PLMN in dependence of i.a. the traffic needs of the cell and the availability of radio channels having low interference. The present invention, the primarily transmitting of Pages in cells having high capacity/high response frequency, is advantageously used in a system utilising ACAA or DCA. The invention is of course not limited to the embodiments described above and shown in the drawing, but may be modified within the scope of the following claims.

What is claimed is:

1. Method in a cellular mobile communication system (PLMN), wherein the cells (C1–C6) of the mobile communication system are divided into at least two classes based upon the internal configuration of each of the cells, whereby a Page (P) to a certain mobile station (MS1) is first transmitted into said cells (C1, C3, C5) assigned to a first class and, if no response is received from the mobile station (MS1), a further Page (P) is transmitted also in cells (C2, C4, C6) assigned to a second class, and whereby said cells (C1–C6) are grouped into location areas (LA) and for each mobile station (MS1, MS2) is registered in which of said location areas it is present, in order to primarily transmit a Page intended for a certain mobile station (MS1) in first class cells belonging to a location area within which said mobile station (MS1) is present.

2. Method according to claim 1, whereby said cells (C1–C6) are assigned to said first class in dependence of their capacity for transmitting Pages (P).

3. Method according to claim 2, whereby said cells (C1–C6) are assigned to one of said classes in dependence of their level in a hierarchical cell structure.

4. Method according to claim 3, whereby said cells (C1–C6) are assigned to first class if they have a high level and to second class if they have a low level in the hierarchical cell structure.

5. Method according to claim 1, whereby said cells (C1–C6) are assigned to first class in dependence of the amount Page responses in each cell.

6. Cellular mobile communication system (PLMN), characterized by means for registering in which one out of two classes cells of the system belong, means for first transmitting a Page (P) into said cell (C1,C3,C5) belonging to a first of said two classes;

means to also transmit a further Page in both classes of cells if no response is received on the first Page.

7. Cellular mobile communication system (PLMN) according to claim 6, comprising at least one exchange (MSC) having said means for registering in which out of two classes that cells of the system belong, and having means for controlling said transmitting of Pages within said cells belonging to a first of said two classes.

8. A method for paging a mobile station in a mobile communications system, the mobile communications system comprising a plurality of cells wherein the cells are grouped into location areas (LA) and wherein each mobile station within the communications system registers which location area the mobile station is located within, the method comprising:

assigning each of the cells of the mobile communication system to a class based upon the internal configuration of each of the cells;

transmitting, in the cells assigned to a first class, a page to the mobile station; and transmitting, if no response is received from the mobile station, a further page in the cells assigned to a second class.

9. The method of claim 8, wherein said step of transmitting, in the cells assigned to a first class, further comprises:

determining the location area in which the mobile station is registered as being located within; and transmitting the page in the cells, within the mobile stations registered location area, which assigned to the first class.

10. The method of claim 8, wherein the cells of the communication system are assigned to a class based on the capacity of the cell to transmit pages.

11. The method of claim 8, wherein the cells of the communication system are assigned to a class based on the level of each cell within a hierarchical cell structure.

12. The method of claim 11, wherein a cell is assigned to the first class if it has a high level and to the second class if it has a low level in the hierarchical cell structure.

13. The method of claim 8, wherein the cells within the mobile communications system are assigned to a class based on the number of page responses in each cell.

* * * * *